April 28, 1970  J. WILDER ET AL  3,508,809
HIGH EFFICIENCY LIGHT POLARIZATION SYSTEM
Filed Dec. 29, 1967
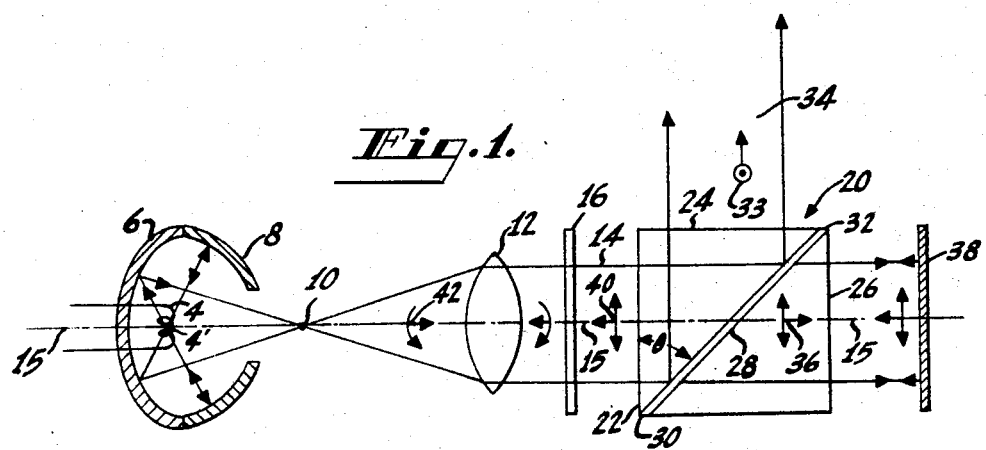
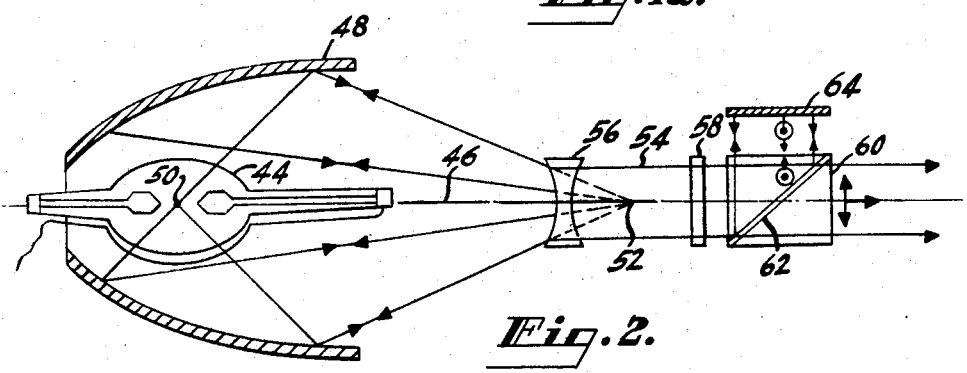
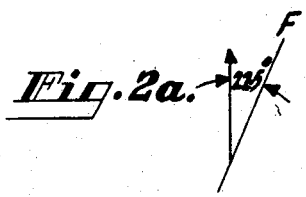
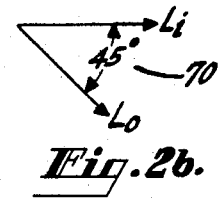
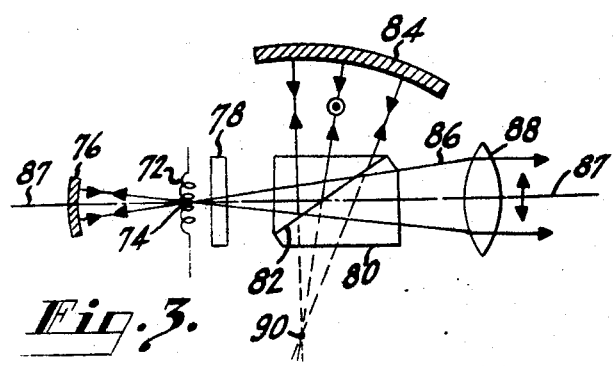
Inventors:
JOSEPH WILDER AND
WALTER GORKIEWICZ
By Eugene M. Whitacre
Attorney United States Patent Office 3,508,809
Patented Apr. 28, 1970

3,508,809
HIGH EFFICIENCY LIGHT POLARIZATION SYSTEM
Joseph Wilder, Princeton, N.J., and Walter Gorkiewicz, New York, N.Y., assignors to RCA Corporation, a corporation of Delaware
Filed Dec. 29, 1967, Ser. No. 694,741
Int. Cl. G02b 1/24, 5/30
U.S. Cl. 350—157                    5 Claims

ABSTRACT OF THE DISCLOSURE

A beam of polarized light is formed from a source of unpolarizd light by placing a light retarder between the source and a polarizing beam splitter and by returning light of one polarization emerging along one output path of said beam splitter back along that path.

---

This invention relates to means for forming a beam of polarized light.

Previous apparatus has formed the beam of polarized light by selecting those components of unpolarized light whice are polarized in one plane and rejecting the other half of the light components which are polarized in an orthogonal plane, thus limiting the theoretical maximum efficiency of utilization of the available unpolarized light to 50%.

It is an object of this invention to provide improved apparatus for forming a beam of polarized light that has an efficiency in excess of 50%.

This objective may be accomplished in the following manner. Light from the source is directed by optical means, including mirrors, through a light retarder to a polarizing beam splitter. The beam splitter directs the components of light polarized in one plane along a first group of output paths and light components polarized in an orthogonal plane along a second group of output paths. Assuming that light in the first group of output paths has the desired polarization, means are inserted in the second group of output paths for returning light in these paths toward the polarizing beam splitter with the same plane of polarization it had when it emerged from the beam splitter. The light so returned passes back toward the source through the beam splitter and the light retarder. The light retarder has no discernable effect on the unpolarized light initially passing through it from the source on its way to the beam splitter, because the light contains components which are polarized in all planes and a rotation of the plane of polarization of each component merely substitutes one component for another so that there is no net change. The light returned through the beam splitter and the retarder is reflected by the light directing mirrors associated with the source back through the source and the retarder to the beam splitter. After this reflected return light has passed through the retarder, its polarization is changed. The beam splitter directs those components of this light whose plane of polarization has been changed by 90° along the first group of output paths so that it is combined with the light originally directed along those paths, thereby producing a brighter beam of linearly polarized light. The change in the plane of polarization is determined by the material from which the retarder is made, its thickness and its orientation and whether the light directing mirrors reflect the light an odd or an even number of times.

The construction and operation of optical systems incorporating the invention will be explained by the following description taken in conjunction with the drawings in which:

FIGURE 1 is a vertical cross section of an optical system incorporating the invention in which collimated light is passed through a retarder which is a quarter wave linear retarder;

FIGURE 1A illustrates the orientation of the retarder of FIGURE 1;

FIGURE 2 is a vertical cross section of an optical system incorporating the invention in which collimated light is passed through a retarder which is either a 180° linear retarder or a 90° circular retarder;

FIGURE 2A illustrates the orientation of a 180° linear retarder where it is used in the arrangement of FIGURE 2;

FIGURE 2B illustrates the orientation of a 90° circular retarder when it is used in the arrangement of FIGURE 2; and FIGURE 3 is a vertical cross section of an optical system incorporating the invention in which the beam is not collimated as it passed through the retarder.

In the following description of the drawings, it will be arbitrarily assumed for ease of reference that horizontal is perpendicular to the plane of the paper and that vertical is up and down in the plane of the paper.

Light is provided by an incandescent filament 4 located at one focal point 4' of an elliptical mirror 6. The point 4' is also the center of curvature of a mirror 8 that is a portion of a spherical surface. As illustrated by the various ray paths shown, light from the filament 4 that initially impinges on the elliptical mirror 6 is reflected toward the other focal point 10, and light that initially impinges on the sphercal mirror 8 is reflected back through the filament 4 to the elliptical mirror 6 and thence toward the focal point 10. If desired, light passing through the focal point 10 can be formed into a collimated beam 14 that is parallel to the axis 15 of the system by placing a negative lens between the focal points 4 and 10 or, as is shown in the drawing, by placing a positive condensing lens 12 beyond the focal point 10. A light retarder in the form of a quarter wave linear light retarder 16 is mounted in the path of the collimated beam of light 14 at a point, in this particular illustration, between the condensing lens 12 and a polarizing beam splitter 20. The light retarder 16 is in a horizontal plane perpendicular to the axis 15, its Z axis is parallel to the axis 15, and as shown in the FIG. 1A, its fast axis F, as viewed along the axis 15, is at an angle of 45° with respect to vertical.

The beam splitter 20 may take a number of forms, but in the particular illustration it is a rhombohedron which may have sides formed from sheets of glass, all except sides 22, 24 and 26 being opaque. The sides 22 and 26 are in horizontal planes perpendicular to the optical axis 15, and the rhombohedron is so proportioned and positioned that a polarized interference filter 28 held between diagonally opposed corners 30, 32 lies in a horizontal plane that intersects the side 22 at Brewster's angle $\theta$. In order to minimize surface reflections, the spaces between either side of the filter 28, and the sides of the rhombohedron can be filled with oil having the same index of refraction as the glass sides. Alternatively, the portion of the rhombohedron on either side of the filter 28 can be made of glass. For reasons previously explained, the light in the collimated beam 14 remains unpolarized after passing through the retarder 16. When the beam 14 impinges on the filter 28, the horizontally polarized components, i.e. those in which the electrical vector is perpendicular to the plane of the paper are reflected upward along a first group of output paths 34 (as indicated by the symbol 33). The other half of the components of the light, namely those components that are vertically polarized, as indicated by the symbol 36, continue unaltered through the filter 28 in a second group of output paths that are generally parallel to the optical axis 15.

Means such as a planar mirror 38 is mounted in the second group of output paths so as to return the light in these paths through the filter 28 to the quarter wave linear retarder 16 without changing the plane of polarization of the light. The light so returned emerges from the left side of the retarder 16 circularly polarzied, as indicated by the symbol 40, and passes through the focal point 10 to the elliptical mirror 6 which reflects it through the filament 4 to the spherical mirror 8. It is then reflected by the mirror 8 back through the filament 4 to the elliptical mirror 6 which reflects it back through the focal point 10 with the handedness of the circular polarization of the light reversed, as indicated by the symbol 42. After being collimated by the lens 12, the light passes through the quarter wave linear retarder 16 and emerges therefrom with a horizontal polarization so that it is reflected by the filter 28 along the group of paths 34, thus adding to the horizontally polarized light originally reflected along these paths and producing a brighter beam. When a quarter wave linear retarder is used, it is essential that the circular polarization of light 40 traveling toward the source 4, be reversed, before it comes back to the retarder 16, and it is, therefore, necessary that it be reflected an odd number of times before arriving at the retarder 16. In this particular example, the circularly polarized light is reflected either once, by the elliptical mirror 6 or three times, by the elliptical mirror 6, the spherical mirror 8 and again by the elliptical mirror 6.

Reference is now made to FIGURE 2, which illustrates an optical system wherein the light retarder can be either a half wave linear retarder or a circular retarder such as a solution of sugar. Light is generated by an arc lamp 44 oriented with its axis coincident with the axis 46 of an elliptical mirror 48. The lamp 44 is positioned so that the center of the arc is at one focal point 50 of the mirror 48. With such an arrangement, the elliptical mirror 48 reflects light from the arc toward the second focal point 52. Formation of a collimated beam 54 of light parallel to the axis 46 may be effected by insertion of a negative lens 56 between the focal points 50 and 52. A light retarder 58 is mounted perpendicularly to the optical axis 48 and between the lens 56 and a polarizing beam splitter 60. The beam splitter 60 has a polarization interference filter 62 that is constructed and oriented in the same way as in the beam splitter 20 of FIGURE 1. If it is desired that the output beam be vertically polarized, a light returning means such as a mirror 64 is mounted in the group of output paths into which the horizontally polarized light is directed by the filter 62. Horizontally polarized light is returned by the mirror 64 and the filter 62 through the retarder 58 and the lens 56 to the elliptical mirror 48. The mirror 48 reflects the light through the focal point 50 to the other side of the mirror 48, at which point it is reflected back toward the focal point 52. The light so reflected is formed by the negative lens 56 into a collimated beam which, after passing through the retarder 58, is vertically polarized so that it passes through the filter 62 along the axis 46 and adds to the vertically polarized light components that initially passed through the filter 62.

It will be noted that light returned by the mirror 64 and filter 62 through the light retarder 58 is reflected twice by the elliptical mirror 48 before it is passed back through the retarder. An even number of reflections is required if the light retarder 58 is a half wave linear retarder or is a 90° circular retarder such as an aqueous solution of dextrose or a basal section of quartz. In the case of the half wave linear retarder, its Z axis is parallel to the axis 46 and its fast axis F is oriented at an angle of plus or minus 22.5° with the vertical, as viewed along the axis 46, one of these relationships being indicated by the diagram of FIGURE 2A. If the retarder is of the circular type such as a dextrose solution, it is merely necessary that its thickness along the axis 46 be such that the plane of polarization of light traveling parallel to the axis 46 be rotated by 45° after passing through the retarder once, as indicated in FIGURE 2B where $L_i$ is the entering light and $L_o$ the emerging light.

In FIGURE 3 a filament 72 is mounted at the center of curvature 74 of a spherical mirror 76 which reflects light from the filament back through the filament to a quarter wave linear retarder 78 that is located between the filament 72 and a Glan-Thompson prism 80 which serves as the polarizing beam splitter. As explained at page 462 of a second edition of a book entitled "Light" by R. W. Ditchburn and published in 1963 by Interscience Publishers, Inc. of New York, N.Y., the prism has a wide acceptance angle so that the light approaching its polarizing surface 82 does not have to be collimated. Light components having a horizontal polarization are directed along one group of output paths to a light returning means in the form of a spherical mirror 84, and light components having a vertical polarization pass through the prism 80 to form a portion of the desired light beam 86 in another group of output paths having components along the axis 87. If required, the beam 86 can be collimated by a condensing lens 88. The center of curvature 90 of the spherical mirror 84 is determined by the intersection of the dotted projections of the divergent rays reflected at the surface 82.

The mirror 84 returns the horizontally polarized light components back approximately along the same paths in which they approach the mirror so that they return to the right-hand side of the quarter wave linear retarder 78. The light emerges from the left-hand side of the retarder 78 with circular polarization of one handedness, and after being reflected by the mirror 76, the handedness is reversed before it comes back to the retarder 78. It emerges from the right-hand side of the retarder 78 vertically polarized so that it can pass through the prism 80 and combine with the light in the beam 86 that initially passed through the prism. If the retarder 78 were a half wave linear retarder or a circular retarder, as discussed in connection with FIGURE 2, the mirror system for directing the light from the source would have to provide an even number of reflections of the light returned to it by the mirror 84. One way of accomplishing this has been illustrated in FIGURE 2 in which the mirror for collecting and directing the light is elliptical.

What is claimed is:
1. Optical apparatus for providing a beam of polarized a beam of polarized light comprising:
   a source of unpolarized light having some degree of transparency,
   optical means including a mirror system for forming along a given axis a beam of light from said source,
   a light retarder and a polarizing beam splitter mounted in the order named along said beam of light from said source,
   said beam splitter directing components in said beam having one plane of polarization along a first group of output paths and components of said beam that are polarized in an orthogonal plane along a second group of output paths,
   means for returning substantially all the light in said second group of output paths without changing its plane of polarization to said beam splitter, and through said beam splitter and said retarder to said mirror system and said light source,
   said mirror system reflecting substantially all said returned light back through said source and said retarder to said beam splitter, the number of reflections provided by said mirror system and the thickness and orientation of said retarder being such that the plane of polarization of the reflected returned light reaching said beam splitter is changed by a predetermined angle so that those components which are polarized in said orthogonal plane are directed by said polarizing beam splitter along said first group of output paths, thereby adding to the light from said beam initially directed along said first group of paths by said beam splitter.

2. Apparatus as defined in claim 1 wherein said light retarder is a 90° linear retarder having its Z axis parallel to the axis of said beam of light and its fast axis at an angle of 45° with respect to said orthogonal plane of polarization, and wherein said mirror system reflects said returned light an odd number of times.

3. Apparatus as defined in claim 1 wherein said light retarder is a 180° linear retarder having its Z axis parallel to said optical axis and its fast axis at an angle of 22.5° with respect to one of said plane of polarization.

4. Apparatus as defined in claim 1 wherein said light retarder is a 90° circular retarder.

5. An apparatus as defined in claim 1 wherein said light retarder is disposed in a plane normal to said given axis.

References Cited

UNITED STATES PATENTS

| | | | |
|---|---|---|---|
| 2,180,114 | 11/1939 | Land | 240—9.5 |
| 2,449,287 | 9/1948 | Flood | 350—173 |
| 3,350,982 | 11/1967 | Marks | 350—152 |
| 3,401,593 | 9/1968 | Altman | 350—152 |

FOREIGN PATENTS 460,666  1/1937  Great Britain.

PAUL R. GILLIAM, Primary Examiner

U.S. Cl. X.R.

240—9.5; 350—152, 173

UNITED STATES PATENT OFFICE
CERTIFICATE OF CORRECTION

Patent No. 3,508,809          Dated April 28, 1970

Inventor(s) Joseph Wilder, et al.

It is certified that error appears in the above-identified patent and that said Letters Patent are hereby corrected as shown below:

Column 3, line 41, cancel "48" and insert -- 46 --.

In the Claims, Column 4, line 47, cancel "a beam of polarized".

SIGNED AND SEALED
SEP 1 - 1970

(SEAL)
Attest:

Edward M. Fletcher, Jr.
Attesting Officer

WILLIAM E. SCHUYLER, JR.
Commissioner of Patents